H. N. BOWMAN.
TRANSFORMER.
APPLICATION FILED SEPT. 21, 1918.
1,320,980. Patented Nov. 4, 1919.
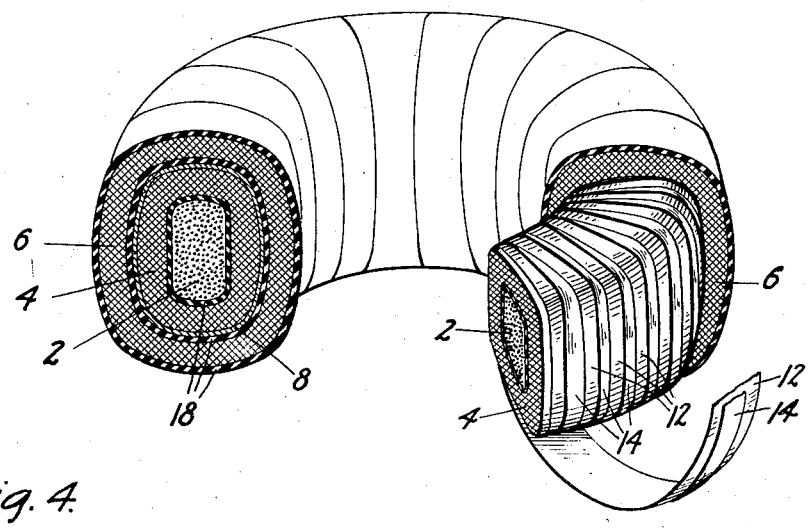
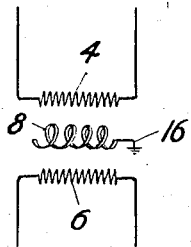
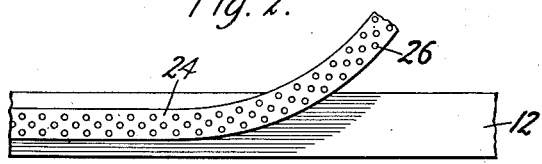
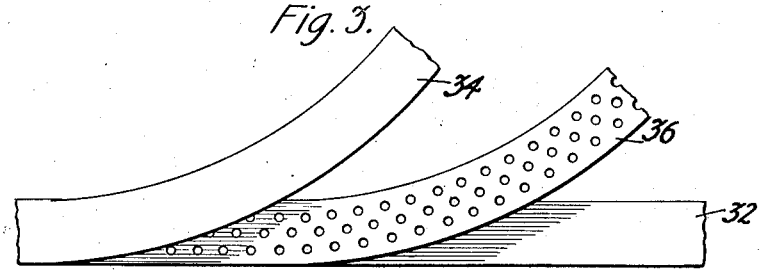
Inventor:
Herman N. Bowman
by J. G. Roberts Att'y.

UNITED STATES PATENT OFFICE.

HERMAN N. BOWMAN, OF NEW YORK, N. Y., ASSIGNOR TO WESTERN ELECTRIC COMPANY, INCORPORATED, OF NEW YORK, N. Y., A CORPORATION OF NEW YORK.

TRANSFORMER.

1,320,980. Specification of Letters Patent. Patented Nov. 4, 1919.

Application filed September 21, 1918. Serial No. 255,171.

*To all whom it may concern:*

Be it known that I, HERMAN N. BOWMAN, a citizen of the United States, residing at New York, in the county of New York, State of New York, have invented certain new and useful Improvements in Transformers, of which the following is a full, clear, concise, and exact description.

This invention relates to transformers and particularly to means for preventing electrostatic induction between the windings of repeating coils or of other transformers used in connection with telephone circuits.

In order to prevent repeating and like coils from transmitting static disturbances from one section of a telephone circuit to another, it has been proposed to insert a grounded metallic sleeve between the inner and outer windings of the coil to act as an electrostatic shield between the two windings, a static charge on either winding of the coil inducing a charge on the sleeve instead of on the other winding. However, if this sleeve extends entirely around the inner coil, it acts as a closed circuit winding and interferes with the transmission through the coil of the talking current variations.

Moreover, when such a shield is used, the manufacture of the coil is rendered more difficult, since the inner winding must be dried and impregnated before the sleeve is fitted in place, and a second drying and impregnation is necessary after the outer winding is in place. These difficulties may be somewhat lessened by longitudinally slitting the sleeve, but if the slit is wide, the shielding effect is weakened, and on the other hand, the use of a thin metal sleeve with a slit whose edges are close together and yet not in conductive relation so as to form a closed circuit, involves a high manufacturing cost on account of the skill and time required.

It has also been proposed, as set forth in an application of Edward J. Pratt, Serial No 202,185, filed November 15, 1917, for an induction coil, and assigned to the same assignee as is the present invention, to use as an electrostatic shield an open-circuit winging of insulated wire, supplementing this winding by a wide-slotted sleeve of thin metal in cases where it is impracticable to place the turns of the wire sufficiently close together throughout their circumferences.

It is an object of this invention, which may be regarded as an improvement on the last described invention, to provide an electrostatic shielding means which may readily be applied to a repeating or other coil during the process of manufacture without interfering with the drying and impregnating steps of manufacture as heretofore practised, but which will nevertheless effectively prevent electrostatic induction from one winding to the other. This result is accomplished by utilizing a base of porous insulating material,—preferably in the form of a tape,—upon one face of which is a layer of metal, this metal-covered tape being placed between the windings of the coil to form an open-circuit winding of one or more layers.

Further objects of this invention will appear from the following detailed description taken in connection with the accompanying drawing, in which Figure 1 is a view partly in section of a toroidal induction coil equipped with a shielding winding in accordance with this invention; Fig. 2 shows a modification of the combined metal and insulation tape from which the shielding winding is formed; Fig. 3 shows a further modification of this tape; and Fig. 4 is a diagrammatic representation of the relation of main and shielding windings of the coil.

Although the invention may with advantage be incorporated in any type of coil, it is particularly applicable to the toroidal type of coil and in the form shown in Fig. 1. The type of repeating coil illustrated comprises a wire or other suitable core 2, an inner winding 4, and an outer winding 6, the windings 4 and 6 being adapted to form parts respectively of separate working circuits or sections thereof. Between the windings 4 and 6 is an open-circuit winding 8. The preferred form of this winding comprises a composite tape formed of a strip 12 of fluid-pervious insulation, which may be suitable paper or other porous fabric, upon one face of which is secured a thin layer of metal 14. This metal layer may be a strip of copper or other foil secured to the strip of insulation by a suitable adhesive or it may consist of a coating of metal deposited in any available manner, provided that a continuous electrical path longitudinally of the tape is formed and the porosity of the base of insulation is not destroyed. The metal layer is electrically connected to a grounding terminal 16. As shown in Fig. 1, the metal strip 14 is preferably narrower than the strip of insulation, being arranged thereon so as to leave an appreciable margin at one or both edges; the purpose of this arrangement will appear later.

In applying the composite tape to a coil, the inner winding is first wound on the core in the usual manner and a layer of the composite tape is wound thereover, the pitch of the winding being such that the successive turns of the tape are overlapped on the outer periphery of the coil to an extent at least equal to the difference in width between the strip of insulation and the metal layer thereon. In some instances more than one layer of the tape may be desirable. After the tape is in place, the outer winding 6 is placed upon the coil in the usual manner, after which the coil is subjected to the customary drying and impregnating processes. Suitable insulation 18 is placed between the core, inner and outer coils and around the outer coil.

By this invention there is provided between the two coils a shield that is substantially continuous in its axial direction, that is, at every point between the outer and inner windings there is interposed a portion of the metal strip 14, so that a static charge on either of the windings is prevented from inducing a charge on the other winding, the induced charge being formed on the metal strip 14. At the same time the strip 12 provides, between each two successive turns, a layer of insulation which separates the turns in a radial direction, thus preventing any turn from becoming short-circuited and interfering with the electromagnetic induction between the windings 4 and 6. Moreover, as this insulation is porous, it affords a passage for moisture from the inner winding 4 during the drying operation and also for the impregnating fluid inward to the inner winding during the impregnating operation.

In Fig. 1 composite tape is shown for clearness, with the metal layer on the outer face of the strip of insulation; but the tape may as advantageously be wound in place so as to bring the insulation on the outside.

In the modified composite tape shown in Fig. 2, the strip of porous insulation 12 carries a layer or strip of metal 24 having a number of small perforations 26; these perforations, while not appreciably reducing the effectiveness of the tape as a screen against electrostatic induction, facilitates somewhat the passage of moisture and impregnating fluid therethrough.

The composite strip shown in Fig. 3 comprises two strips of porous insulation 32 and 34, between which is a strip of metal 36 of substantially the same width as the insulation strips 32 and 34. A tape of this sort may be wound with a somewhat greater pitch relative to its width than the other forms described, since the metal strip is of greater width; the second layer of insulation 34 materially lessens the likelihood that a short circuit will be formed between successive turns of the metal, as it interposes a layer of insulation between the edge of each turn and the overlapped portion of the preceding turn.

What is claimed is:

1. In an electrostatic shield for the windings of transformers or the like, a base of fluid-pervious electrical insulation, and a coating of metal on said base.

2. An electrostatic shield comprising a fluid-pervious strip of electrical insulation, and a layer of metal on one face of said strip.

3. An electrostatic shield comprising a fluid-pervious strip of electrical insulation, and a perforated layer of metal on one face of said strip.

4. An electrostatic shield comprising a fluid-pervious strip of electrical insulation, and a layer of metal narrower than said strip on one face of said strip.

5. An electrostatic shield comprising a fluid-pervious strip of electrical insulation, and a layer of metal on one face of said strip, said layer of metal covering less than the entire surface of said face of the strip.

6. An electrostatic shield comprising a spirally wound strip of electrical insulation, and a layer of metal on one face of said strip.

7. An electrostatic shield comprising a spirally wound strip of electrical insulation, and a layer of metal on one face of said strip, the turns of said spiral being overlapped.

8. An electrostatic shield comprising a spirally wound strip of electrical insulation, and a layer of metal on one face of said strip narrower than said strip, the turns of said spiral being overlapped to an extent equal to the difference in width between the strip of insulation and the layer of metal.

9. An electrostatic shield comprising a spirally wound strip of metal having its successive turns overlapped, and a layer of porus insulation between said successive turns.

10. In a transformer, a pair of main windings, and an electrostatic shield between said windings comprising a base of porus insulating material and a layer of metal on said base arranged to form an open circuit around one of said windings.

11. In a transformer, a pair of main windings, and an electrostatic shield between said windings comprising a spiral winding of metal foil and a layer of porus insulation between successive turns of said foil.

12. In a transformer, a pair of main windings, an electrostatic shield between said windings comprising a spirally wound strip of fluid-pervious electrical insulation and a layer of metal on one face of said strip narrower than said strip, the turns of said spiral being overlapped to an extent equal to the difference in width between the strip of insulation and the layer of metal.

13. In a transformer, a pair of main windings, and an electrostatic shield between said windings comprising a spirally wound strip of electrical insulation, a layer of metal on one face of said strip, and means for grounding one end of said layer of metal.

14. In a transformer, a pair of main windings, an electrostatic shield comprising a strip of metal having its turns arranged to form a shell substantially continuous in an axial direction and fluid-pervious insulation separating the successive turns in directions radial of said turns.

In witness whereof, I hereunto subscribe my name this 6th day of September A. D., 1918.

HERMAN N. BOWMAN.